(12) United States Patent
Obendiek

(10) Patent No.: US 6,736,445 B2
(45) Date of Patent: May 18, 2004

(54) TOP FOR A CONVERTIBLE VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/280,784

(22) Filed: Oct. 25, 2002

(65) Prior Publication Data

US 2003/0080580 A1 May 1, 2003

(30) Foreign Application Priority Data

Oct. 26, 2001 (DE) .......................... 101 52 944

(51) Int. Cl.$^7$ .................................................. B60J 7/00
(52) U.S. Cl. ........................ 296/107.17; 296/107.08; 296/107.09
(58) Field of Search ..................... 296/107.17, 108, 296/107.09, 146.14, 180.1, 107.07, 107.08, 121, 117, 201

(56) References Cited

U.S. PATENT DOCUMENTS

| | | | | |
|---|---|---|---|---|
| 645,621 | A | * 3/1900 | Giles | 235/124 |
| 5,490,709 | A | * 2/1996 | Rahn | 296/117 |
| 5,542,735 | A | * 8/1996 | Furst et al. | 296/107.17 |
| 5,584,522 | A | * 12/1996 | Kerner et al. | 296/37.16 |
| 5,769,483 | A | * 6/1998 | Danzl et al. | 296/107.08 |
| 5,775,766 | A | * 7/1998 | Schaible et al. | 296/107.09 |
| 5,806,912 | A | * 9/1998 | Ramaciotti et al. | 296/107.09 |
| 5,967,591 | A | * 10/1999 | Muehlhausen | 296/107.17 |
| 5,979,970 | A | * 11/1999 | Rothe et al. | 296/107.17 |
| 6,019,416 | A | * 2/2000 | Beierl | 296/107.17 |
| 6,033,008 | A | * 3/2000 | Mattila | 296/107.17 |
| 6,062,625 | A | * 5/2000 | Elelnrieder et al. | 296/66 |
| 6,312,041 | B1 | * 11/2001 | Queveau et al. | 296/107.17 |
| 6,312,042 | B1 | * 11/2001 | Halbweiss et al. | 296/107.17 |
| 6,336,673 | B1 | * 1/2002 | Rothe et al. | 296/107.17 |
| 6,390,532 | B1 | * 5/2002 | Mac Farland | 296/107.17 |
| 6,419,296 | B2 | * 7/2002 | Dintner et al. | 296/107.18 |
| 6,422,637 | B1 | * 7/2002 | Mac Farland | 296/107.17 |
| 6,425,621 | B2 | 7/2002 | Miklosi et al. | 296/108 |
| 6,450,562 | B1 | * 9/2002 | Miklosi et al. | 296/115 |
| 6,467,832 | B2 | * 10/2002 | Schutt et al. | 296/107.17 |
| 6,481,781 | B2 | * 11/2002 | Bergerhoff et al. | 296/107.17 |
| 6,497,446 | B2 | * 12/2002 | Obendiek | 296/107.17 |
| 6,502,891 | B2 | * 1/2003 | Russke | 296/107.17 |
| 6,502,892 | B2 | * 1/2003 | Eberle | 296/107.17 |
| 6,505,881 | B2 | * 1/2003 | Kinnanen | 296/107.17 |
| 6,572,175 | B2 | * 6/2003 | Schutt et al. | 296/107.17 |
| 6,592,169 | B2 | * 7/2003 | Obendiek | 296/107.17 |
| 6,595,572 | B2 | * 7/2003 | Schuler et al. | 296/107.17 |
| 6,604,775 | B2 | * 8/2003 | Obendiek | 296/107.08 |
| 6,623,064 | B2 | * 9/2003 | Schutt et al. | 296/108 |
| 2001/0019213 | A1 | * 9/2001 | Eberle | 296/107.17 |
| 2002/0105205 | A1 | * 8/2002 | Willard | 296/107.17 |
| 2003/0042751 | A1 | * 3/2003 | Antreich | 296/107.17 |
| 2003/0080579 | A1 | * 5/2003 | Reinsch | 296/107.17 |
| 2003/0085587 | A1 | * 5/2003 | Reinsch | 296/107.17 |

FOREIGN PATENT DOCUMENTS

| | | |
|---|---|---|
| DE | 4431656 | 12/1995 |
| DE | 19959317 | 1/2001 |
| DE | 19964029 | 5/2001 |

* cited by examiner

*Primary Examiner*—Kiran Patel
(74) *Attorney, Agent, or Firm*—Davidson, Davidson & Kappel, LLC

(57) ABSTRACT

A top for a convertible vehicle includes a rear top part attached pivotably to the convertible vehicle and a front, movably mounted top part. In a closed state of the top, the front top part and the rear top part are disposed over the convertible vehicle in a closed state of the top. In an open state of the top, the front top part and the rear top part are disposed behind front seats of the convertible vehicle with the front top part disposed below the rear top part.

13 Claims, 6 Drawing Sheets

TOP FOR A CONVERTIBLE VEHICLE

Priority to German Patent Application No. 101 52 944.9, filed Oct. 26, 2001 and hereby incorporated by reference herein, is claimed.

BACKGROUND INFORMATION

The invention relates to a top for a convertible vehicle, comprising a rear top part attached pivotably to the convertible vehicle, a front, movably mounted top part, the front top part and the rear top part being arranged over the convertible vehicle in a closed state of the top, the front top part and the rear top part being deposited behind front seats of the convertible vehicle in an open state of the top.

A general disadvantage of convertible vehicles is that the top is deposited in a rear storage compartment of vehicle in the open state of the top, as a result of which a trunk volume is significantly reduced in comparison with a comparable, conventional sedan. This is particularly true of convertible vehicles whose top is as least partially composed of rigid elements. However, everyday experience has shown that convertible vehicles are rarely driven with more than two occupants, at least in the open state of the top. Convertible vehicles are therefore advantageously provided, in which the backseat region of the vehicle, which is a four-seater vehicle in the closed state of the top, is used for depositing the convertible top. In addition, when the top is deposited in the rear storage compartment, technically complex measures, such as a pivotable rear window shelf and a rear lid which can be pivoted counter to the direction of travel are generally required.

DE 44 31 656 C1 describes a convertible vehicle having a top which essentially comprises two hard shell parts which, after pivoting of a rear seat bench, can be brought into the rear region of the vehicle, a front shell part of the top coming to lie above a rear shell part of the top, which part is pivoted into an inverted position and contains a rear window. This arrangement of the shell parts of the top severely restricts the creative possibilities when designing the bodywork shape of a vehicle of this type, since a large movement space for the rear shell part, which generally has a particularly wide shape in the region of the C-pillars, is required. In addition, the convexity of the two shell parts, the convexity being in opposite directions in the deposited position, leads to a large cavity remaining which, in the present case, is to be made use of as a loading region, but is generally found rather to be an unfavorable solution. In addition, the dimensions of the front shell part, for example, mean that it is not suitable for ensuring complete covering of the rear region of the vehicle in the open state of the top, as a result of which additional measures, for example rolling screens, are required. The rear seat bench also has to be pivoted in a complicated and unusual manner, which necessitates a design of the rear seat bench, which differs in comparison with a corresponding sedan and is therefore cost-intensive.

SUMMARY OF THE INVENTION

It is an object of the invention to provide a top for a convertible vehicle, in which the top takes up as small as possible an amount of a storage compartment volume provided in the rear region of the vehicle.

A top according to the invention for a convertible vehicle comprises a rear top part attached pivotably to the convertible vehicle, a front, movably mounted top part, the front top part and the rear top part being arranged over the convertible vehicle in a closed state of the top, the front top part and the rear top part being deposited behind front seats of the convertible vehicle in an open state of the top, and the front top part being deposited below the rear top part in the open state of the top.

In this case, the front top part is advantageously deposited below the rear top part in the open state of the top, which, with the top parts having a unidirectional convexity, results in a particularly small amount of space being taken up. In addition, the rear top part lying on top is, because of its shaping, particularly suitable for ensuring a covering of the convertible vehicle in the open state of the top, said covering extending from the rear wall of the front seats of the vehicle as far as the front edge of a conventional storage compartment lid. This means, in particular, that the further subassemblies, such as a movable rear window shelf and a rear lid which can be pivoted open counter to the direction of travel, which subassemblies are necessary in the case of multi-part hard-shell folding tops which can be deposited in a trunk region of the vehicle, can be omitted.

In a preferred embodiment of a top according to the invention, the front top part is connected to the convertible vehicle by means of a four-bar linkage comprising a first main link and a second main link, as a result of which, on the one hand, an especially adapted movement of the front top part is made possible in a simple manner and, on the other hand, a B-pillar of the convertible vehicle is formed by the correspondingly shaped main links in the closed state of the top. As a result, in the closed state of the top a particular degree of safety is ensured should the vehicle overturn due to an accident.

The rear top part is advantageously connected to the convertible vehicle via a link mechanism, the link mechanism, firstly, being drivable by means of a power input unit and, secondly, being connected to the front top part by means of a coupling element. The front top part and the rear top part can therefore particularly advantageously be driven at the same time by means of a single power input unit, with the result that the entire sequence of movement of a top according to the invention starting from one of the two, open or closed states of the top and ending in the respective other of the two states of the top can be realized with particularly few cost-intensive drive elements. In particular, the power input unit can be designed in a known manner as a linear drive cylinder.

In the case of a top according to the invention, a movable rear seat is preferably provided, a seat for a rear passenger being freed in a swung open position of the rear seat and a storage compartment for the top, which is deposited in the open position of the top, being freed in a swung down position of the rear seat. This makes it possible in a favorable manner for the storage compartment for the top, which is deposited in the open state of the top, to be provided by means of conventional rear seats, in which the backrest can be folded over in the direction of travel, with the result that in the case of a top according to the invention, costly special designs of the rear seats can be omitted.

In a preferred embodiment of a top according to the invention an upper front edge of the rear top part is positioned lower in the open state of the top than in the closed state of the top. This enables the rear top part to be used as a flat cover of a deployment region of the top in the open state of the top, achieving a fully opened roof with no open roof parts being arranged much higher than an essentially straight upper border of the vehicle body.

A particularly preferred embodiment of a top according to the invention further comprises a storage compartment lid, the storage compartment lid being arranged behind the rear top part and the storage compartment lid sealing the rear top part from above. Such a sealing arrangement not only ensures a safe protection of the inner parts of the vehicle against water and dirt, but also enables a very smooth and continuous design of the entire vehicle body.

In an alternative embodiment of a top according to the invention, the rear top part can further be arranged in the same position as in the closed state of the top with the front top part being opened and deposited behind front seats, thereby, in addition to the open state and the closed state, defining a third useable state of the top in which the opening of the roof is a targa-like opening. In this third state the upper front edge of the rear top part is positioned slightly above the region of the drivers head, the rear top part providing an advantageous and effective shielding of wind.

In an alternative embodiment of a top according to the invention for a convertible vehicle, the front top part can also be held directly on the rear top part. In this case, the front top part can be pivoted under the rear top part by means of a link mechanism connecting the top parts. However, it is also possible to displace the front top part essentially parallel under the rear top part by means of a linear guide.

Further advantages and features of a top according to the invention for a convertible vehicle emerge from the exemplary embodiment described in the following and from the dependent claims.

A preferred exemplary embodiment of a top according to the invention will be described below and explained in greater detail with reference to the attached drawings, in which:

DETAILED DESCRIPTION OF A PREFERRED EMBODIMENT

Figure 1:
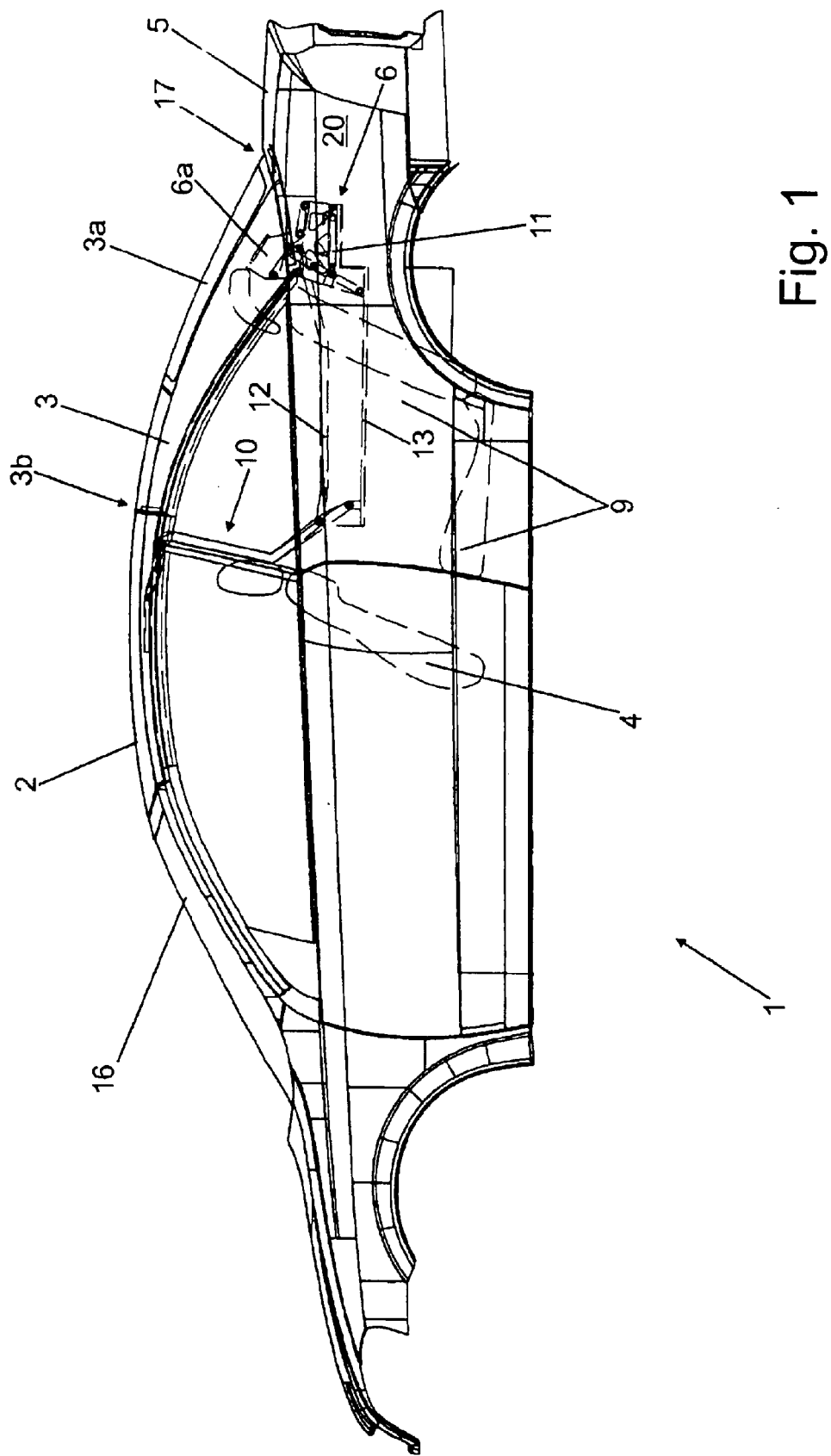
FIG. 1 shows a side view of a top according to the invention for a convertible vehicle in a closed state of the top.

As FIG. 1 shows, the top according to the invention for a convertible vehicle 1 comprises a front top part 2, which is designed as a rigid shell part, and a rear top part 3, which is likewise designed as a rigid shell part and contains a rigid rear window 3a. In the closed state of the top according to FIG. 1, the two top parts 2, 3 cover the convertible vehicle from an upper edge of a windshield 16 as far as a front end region of a storage compartment lid 5. In the closed state of the top shown according to FIG. 1, the lateral regions of the rear top part 3 form C-pillars of the convertible vehicle 1. A rear seat bench 9 is arranged in the rear of the convertible vehicle 1. Linkage parts holding the top parts 2, 3 and drive devices of the convertible top are arranged mirror symmetrically to one another on both sides of the vehicle, the attached drawings and the following description being restricted to one side of the vehicle. An elongate bearing element 13 is connected fixedly to the convertible vehicle 1 in the rear, respectively lateral vehicle region. In a front region of the elongate bearing element 13, a first main link 7 and a second main link 8 are fastened pivotably to the bearing element. In their end regions facing away from the bearing element 13 the main links 7, 8 are connected in a hinged manner to each other via a coupling element 14, with the result that a four-bar linkage 10 is formed by the coupling element 14, the first main link 7, the second main link 8 and the bearing element 13. The coupling element 14 of the four-bar linkage 10 is connected fixedly to the front top part 2. The two main links 7, 8 are shaped such that they are bent a number of times and are arranged in such a manner that they lie one above the other at least in some sections in the transverse direction of the Vehicle in the closed state of the top according to FIG. 1 and FIG. 5 and in their spatial arrangement and their static effect perform the function of a B-pillar of the convertible vehicle 1.

In the rear region of the elongate bearing element 13 a link mechanism 6 is formed on the bearing element 13. A cam disk 6e is secured rotatably on the bearing element 13. The cam disk 6e is also connected to the bearing element via an intermediate link 6d and a control link 6c, which is coupled to the latter, with the result that when the control link 6c is pivoted by means of a power input unit 11, which is supported pivotably against the bearing element 13 and is designed as a linear drive cylinder, a rotational movement of the cam disk 6e relative to the bearing element 13 is forcibly brought about by means of the intermediate link 6d arranged between the control link 6c and cam disk 6e. Furthermore, a support element 6a is coupled to the cam disk 6e, said support element also being connected in an articulated manner to a guide link 6b which is connected in turn in an articulated manner to the bearing element 13, so that a four-bar linkage 15 is defined by the bearing element 13, the cam disk 6e, the support element 6a and the guide link 6b, the movement of which linkage is defined by the abovementioned, forced rotational movement of the cam disk 6e. Finally, a coupling element 12, which is connected in a hinged manner at one end to the cam disk 6e and at the other end to an extension 7a of the first main link 7 of the four-bar linkage 10, is provided.

A storage compartment volume 20, which is covered in a conventional manner by means of a storage compartment lid 5, is provided in the rear region of the convertible vehicle 1.

Figure 2:
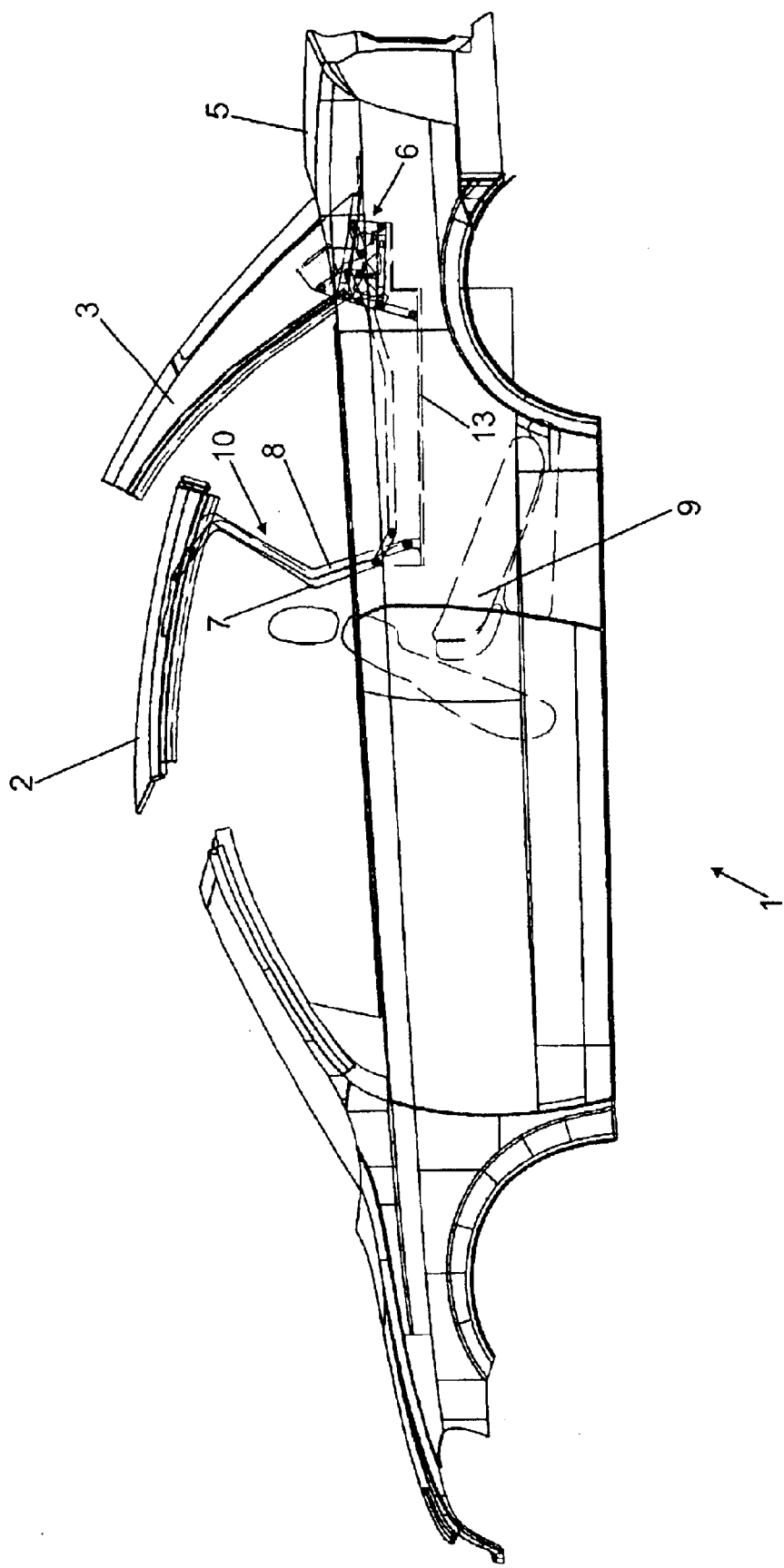
FIG. 2 shows the top according to FIG. 1 in a first step of an opening movement of the top.
Figure 3:
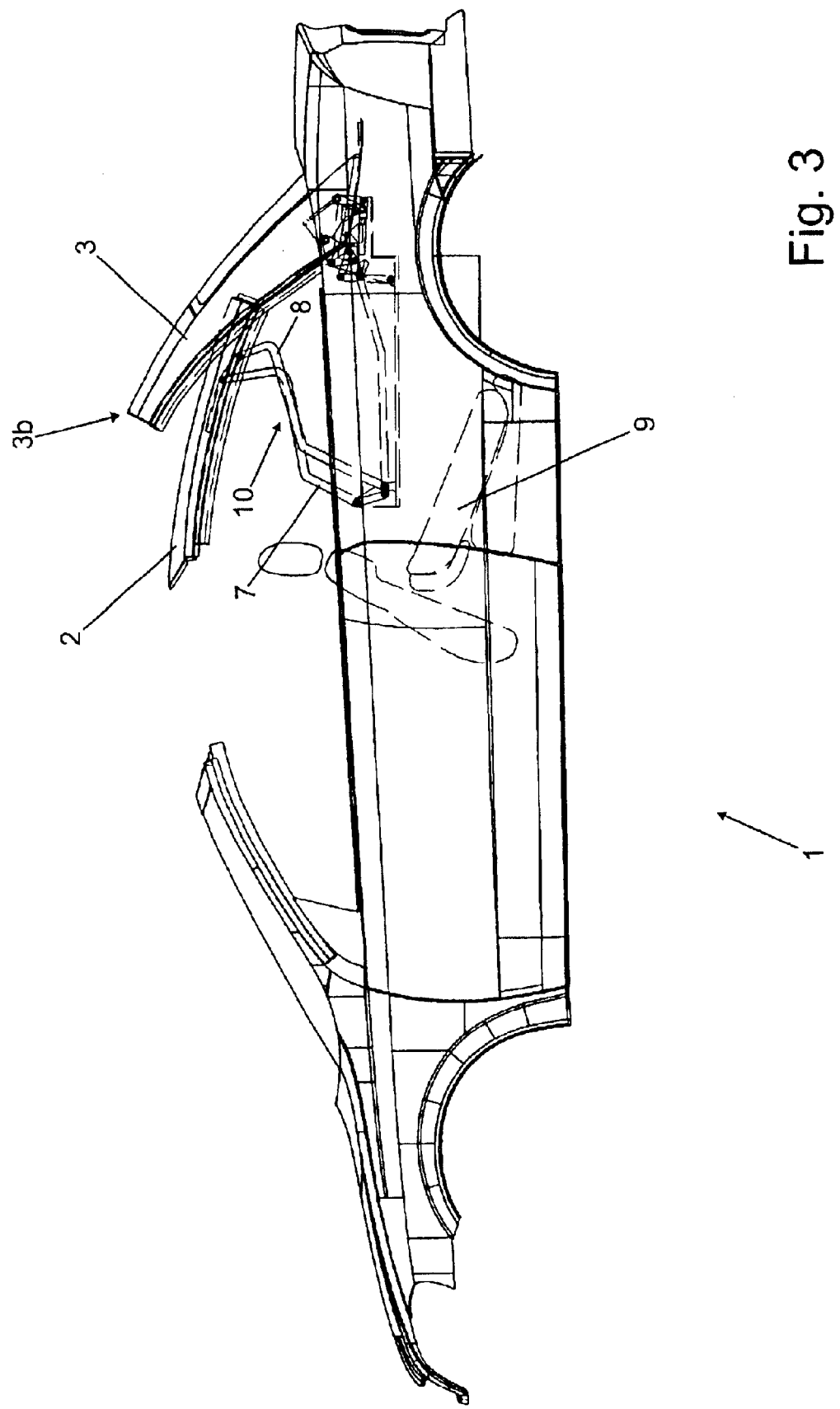
FIG. 3 shows the top according to FIG. 1 in a second step of an opening movement of the top.
Figure 4:
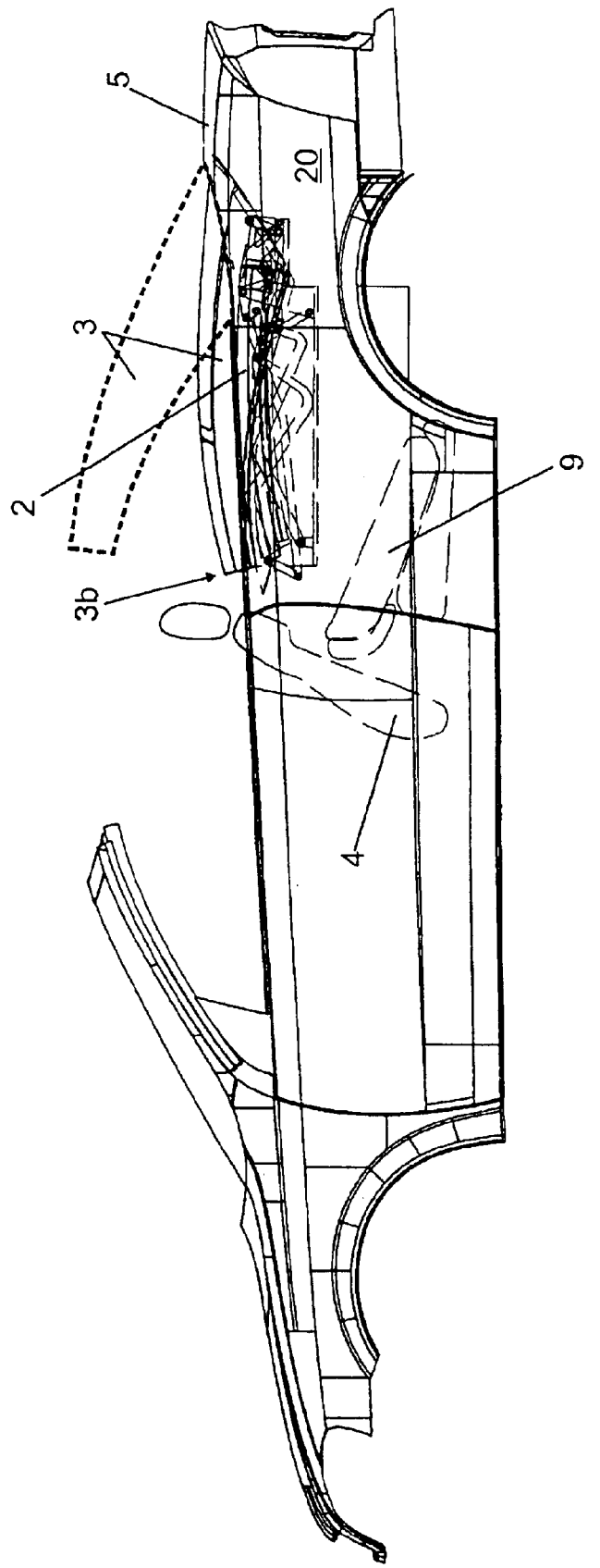
FIG. 4 shows the top according to FIG. 1 in an open state of the top, with the top being deposited in the backseat region of the convertible vehicle.
Figure 5:
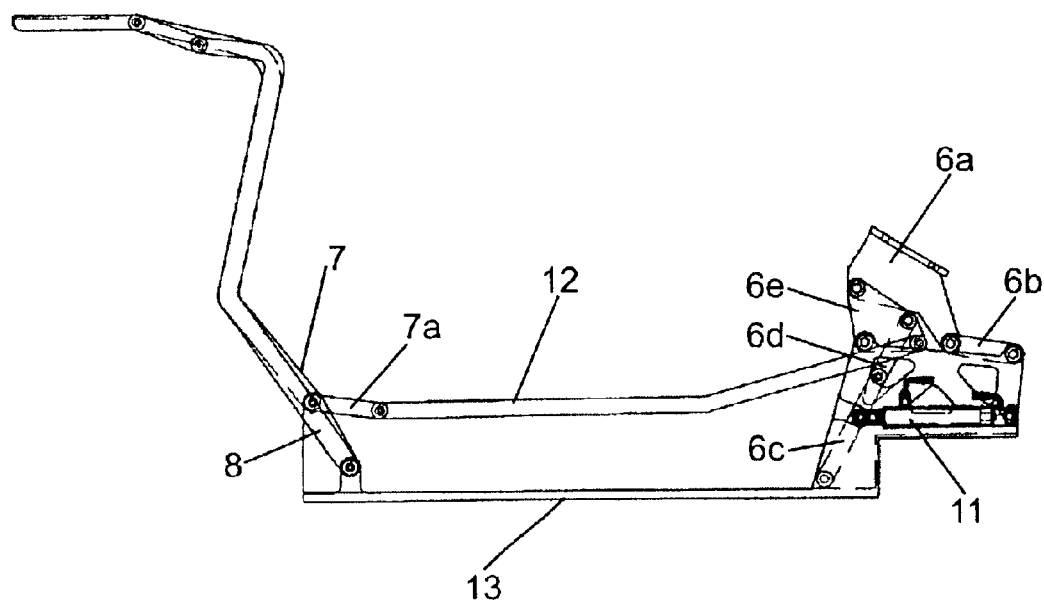
FIG. 5 shows a side view of a drive linkage of the top from FIG. 1 in the position of the top according to FIG. 1.
Figure 6:
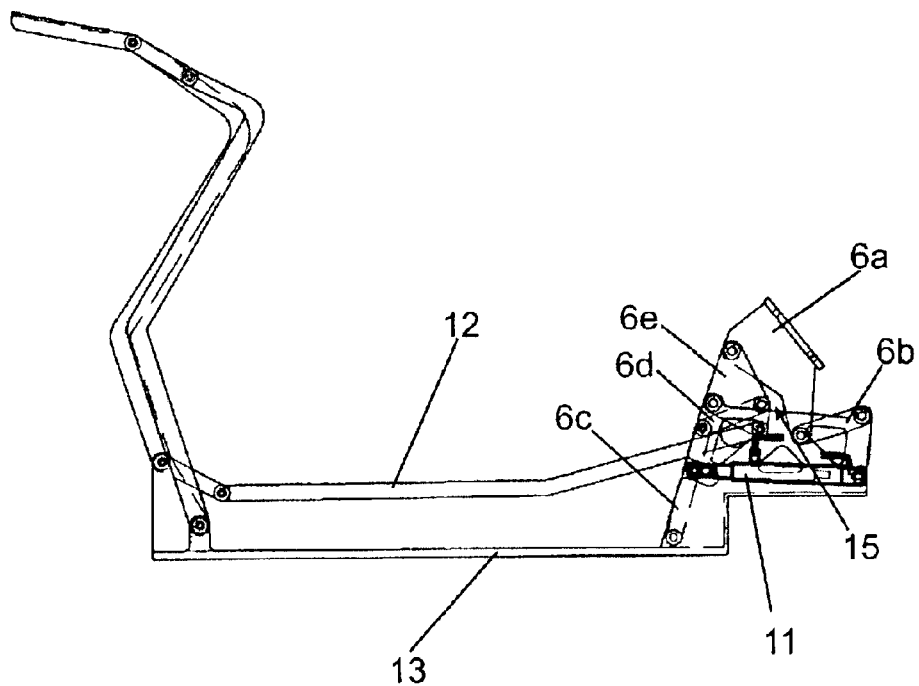
FIG. 6 shows the drive linkage according to FIG. 5 in the position of the top according to FIG. 2.
Figure 7:
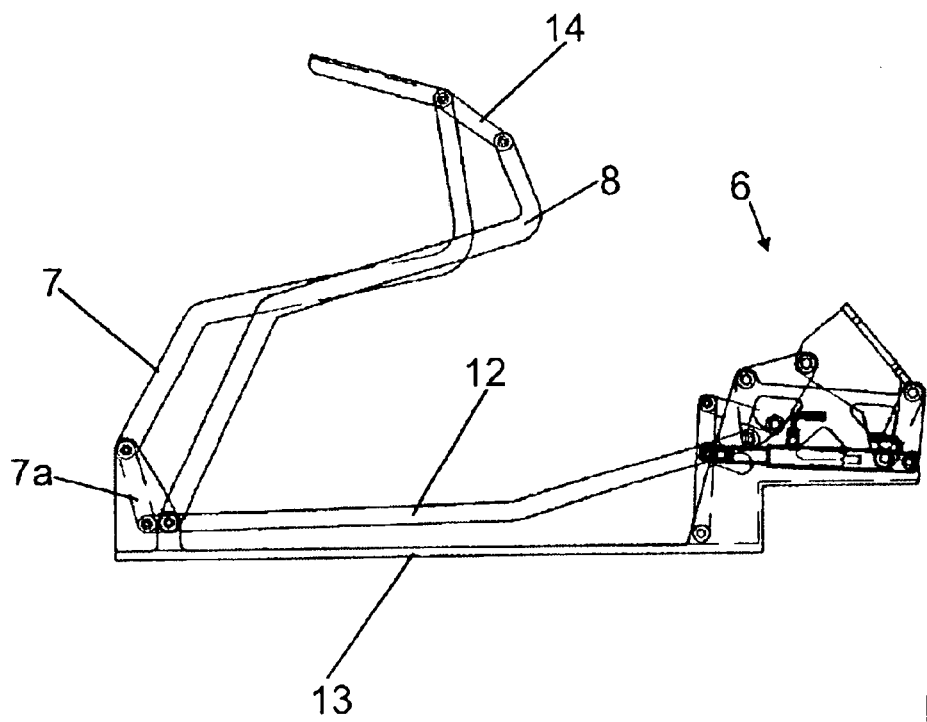
FIG. 7 shows the drive linkage according to FIG. 5 in the position of the top according to FIG. 3.
Figure 8:
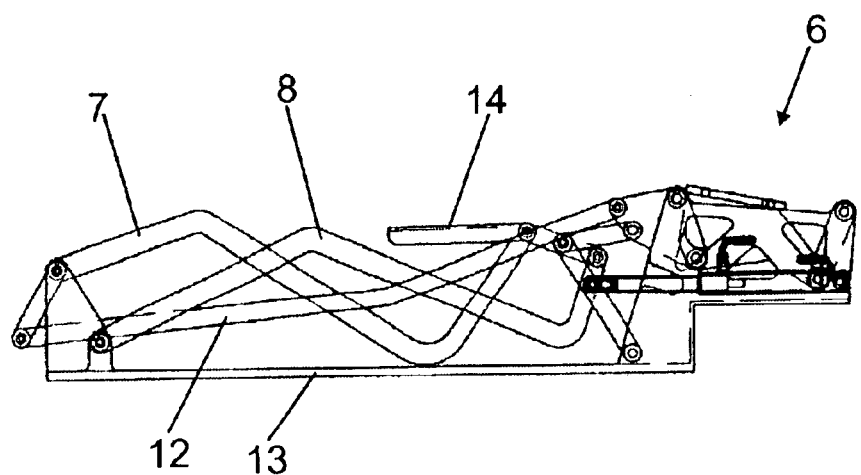
FIG. 8 shows the drive linkage according to FIG. 5 in the position of the top according to FIG. 4.

The invention functions as following:

In the closed state of the top according to FIG. 1, the linear drive cylinder of the power input unit 11 is completely retracted (see FIG. 5). Extension of the drive cylinder then initiates the opening movement of the top, in which case, first of all, in a first step of the opening movement of the top (see FIG. 2 and FIG. 6) the extension of the drive cylinder of the power input unit 11 causes the rear top part 3 to be pivoted counter to the direction of travel. At the same time, pivoting of the front top part 2 counter to the direction of travel is brought about by means of the four-bar linkage 10, which is driven by means of the coupling element 12. An intermediate position in this first step of the opening movement is illustrated in FIG. 2. On a further extension of the drive cylinder of the power input unit 11, the design of the above-described link mechanism 6 causes the rear top element 3 to be situated in the region of a position in which it is pivoted up to the maximum and in which it, as observed by the travel of the drive cylinder, only executes a small movement and passes through a maximum of its opening angle. In this position of the rear top part 3, the front top part 2 is pivoted under the rear top part 3 owing to the design of the four-bar linkage 10. An intermediate position of a second step of an opening movement of the top is illustrated in FIG. 3, in which the front top part 2 has already been partially pivoted under the rear top part 3 and the rear top part 3 is situated essentially in the region of its position in which it is pivoted open to the maximum. During the further course of the opening movement, again caused by further extension of the drive cylinder of the power input unit 11, the front top part 2 is lowered below the rear top part 3 into the rear region of the convertible vehicle 1, and the rear top part 3 is pivoted back in the direction of travel after passing through its maximum opening angle. As soon as the drive cylinder of the power input unit 11 has reached its fully extended position, the top according to the invention is in an open state in which it is deposited in the rear region of the convertible vehicle 1 according to FIG. 4 and FIG. 8. In this case, the front top part 2 is deposited under the rear top part 3 with unidirectional convexity, and the rear top part 3 forms a covering of the convertible vehicle 1, said covering extending from a rear end region of front seats 4 as far as a front end region of the storage compartment lid 5. Owing to the shaping of the rear top part 3, adequate covering of the convertible vehicle 1 is achieved in this deposited position of the top, with the result that further measures, such as a tarpaulin or additional, rigid covering elements, are omitted. The space taken up by the deposited top essentially corresponds to the passenger compartment for the rear passengers. Care should be taken to ensure that before beginning the opening movement of the top the backrest of the rear seat bench 9 has been folded forward in order to free the space for depositing the top.

In the closed state of the top according to FIG. 1 and FIG. 5, the rear seat bench 9 may, however, also be folded over for the purpose of increasing the usable storage compartment volume 20, with the result that a passage between the storage compartment volume 20 and the occupant region of the convertible vehicle 1 is provided in a known manner.

It has to be noted out that in the closed state of the top (as shown in FIG. 1) an upper front edge 3b of the rear top part 3 is positioned essentially higher than in the open state of the top (as shown in FIG. 4). As can be understood from the comparison of FIG. 1 with FIG. 4, the lowering of the rear top part 3 and hence the upper front edge 3b enables an open state of the top in which the top parts 2, 3 are almost in line with an straight upper border of the vehicle body. In the open arrangement, the rear top part 3 is forming an essentially flat and horizontal cover of a rear region of the vehicle.

An advantageous aspect of the preferred embodiment as described is the sealing arrangement of the rear top part 3 with respect to the storage compartment lid 5. In the open state as well as in the closed state, a front edge of the storage compartment lid is arranged above a rear edge of the rear top part. A seal 17 is fixed either to the rear top part edge or to the compartment lid edge, such that an essentially perpendicular pressure is effected upon the seal 17. Therefore, the storage compartment lid 5 is sealing the rear top part 3 from above, which enables a particularly elegant outline of that region of the vehicle body where the rear top part and the compartment lid abut.

What is claimed is:

1. A top for a convertible vehicle moveable between an open state and a closed state, the top comprising:
    a rear top part attached pivotably to the convertible vehicle; and
    a front, movably mounted, top part;
    wherein, in the closed state of the top, the front top part and the rear top part are disposed over the convertible vehicle,
    wherein, in the open state of the top, the front top part and the rear top part have a unidirectional convexity and are disposed behind front seats of the convertible vehicle with the front top part below the rear top part and the rear top part forms a covering of the convertible vehicle, and
    wherein an upper front edge of the rear top part is positioned lower in the open state of the top than in the closed state of the top.

2. The top as claimed in claim 1, wherein, in the open state of the top, the covering has a rear edge disposed adjacent to a storage compartment lid of the convertible vehicle and a front edge adjacent to the front seats of the convertible vehicle.

3. The top as claimed in claim 1, further comprising a four-bar linkage connecting the front top part to the convertible vehicle, the four-bar linkage including a first main link and a second main link.

4. The top as claimed in claim 3, wherein, in the closed state of the top, a B-pillar of the convertible vehicle is formed by at least one of the first and second main links.

5. The top as claimed in claim 1, further comprising a link mechanism connecting the rear top part to the convertible vehicle.

6. The top as claimed in claim 5, wherein the link mechanism is actuatable using a power input unit.

7. The top as claimed in claim 5, wherein the link mechanism is connected to the front top part using a coupling element.

8. The top as claimed in claim 7, wherein a movement of the front top part and a movement of the rear top part are driveable by a single power input unit in at least one direction between the open and closed states of the top.

9. The top as claimed in claim 8, wherein the power input unit includes a linear drive cylinder.

10. The top as claimed in claim 1, further comprising a rear seat moveable between a swung up position for accommodating a passenger and a swung down position for accommodating the top in the open state of the top.

11. The top as claimed in claim 1, further comprising a link mechanism for holding the front top part on the rear top part in the open state.

12. The top as claimed in claim 1, wherein the top is further moveable to a third state, wherein the front top part is disposed behind the front seats and the rear top part is disposed over the convertible vehicle as in the open state.

13. The top as claimed in claim 1, further comprising a storage compartment lid disposed behind the rear top part and providing a sealing interface with respect to the rear top part from above.

* * * * *